Patented Apr. 24, 1928.

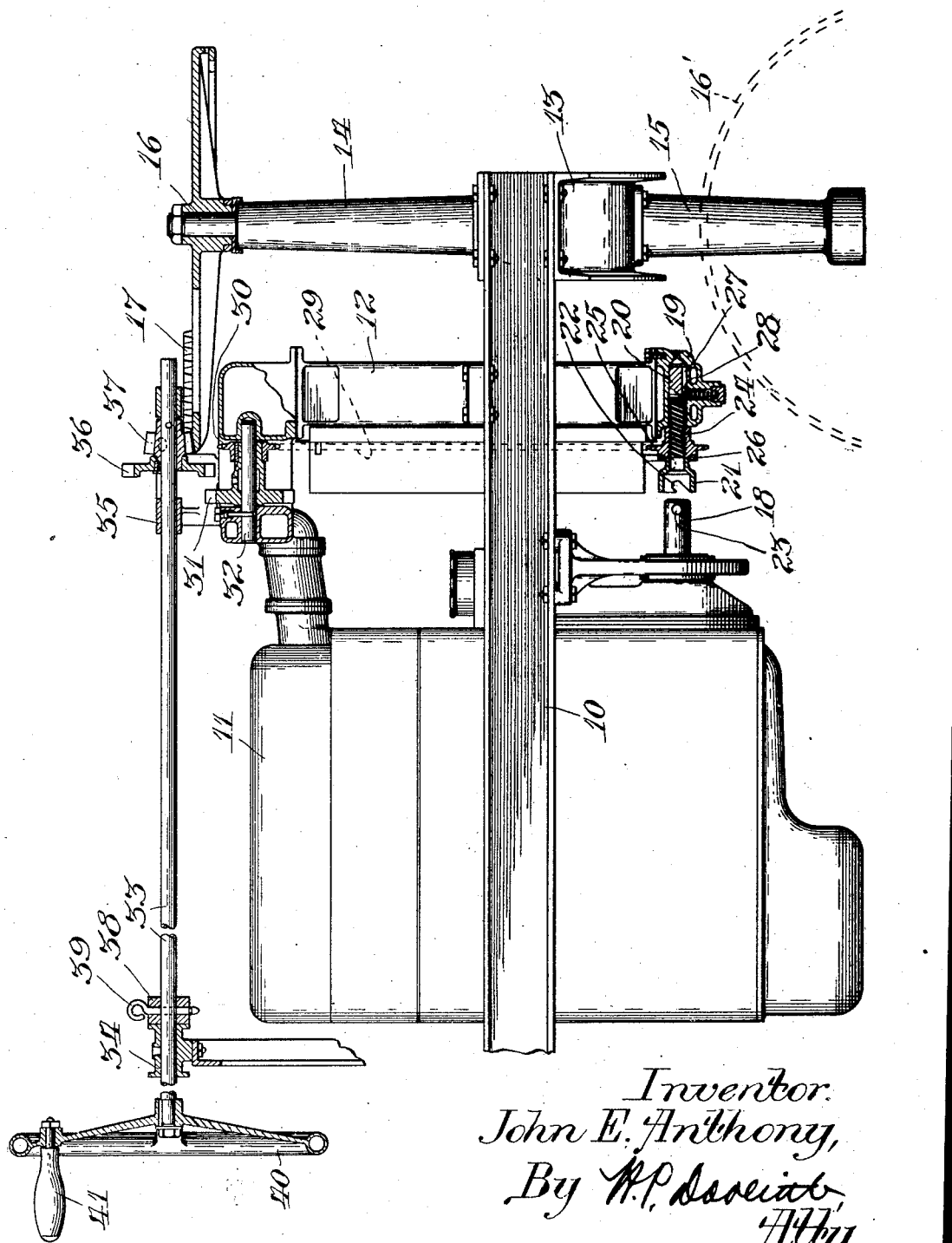

1,667,361

UNITED STATES PATENT OFFICE.

JOHN E. ANTHONY, OF CHICAGO, ILLINOIS, ASSIGNOR TO INTERNATIONAL HARVESTER COMPANY, OF CHICAGO, ILLINOIS, A CORPORATON OF NEW JERSEY.

CONTROL MECHANISM FOR TRACTORS.

Application filed November 26, 1923. Serial No. 677,161.

This invention relates to a control mechanism for motor vehicles employing internal combustion engines and is more specifically directed to improvement of the control devices on farm and industrial tractors.

The principal object of the invention is to provide efficient cranking mechanism of simple construction that can be actuated from the operator's seat on the tractor and that will require no modification in construction of the tractor on which it is used. This has been accomplished by combining a novel form of starting mechanism with the steering shaft of a certain type of tractor in such a way that the one shaft is made to serve as actuating means for both the steering and starting mechanisms.

The invention accordingly resides in the combinations of parts and details of construction, or equivalents thereof, hereinafter more particularly described and claimed.

The accompanying drawing is a side view of the forward portion of a tractor including the invention with certain of the parts constituting the novel structure shown in section.

The invention is illustrated in connection with a tractor of the type having a centrally positioned steering truck and comprising side members 10, engine 11 and radiator 12. The forward ends of the said members 10 extend beyond the radiator where they are connected by a cross head 13 which in this instance is a casting having a central vertical opening in alinement with which there is secured to the casting upper and lower tubular sections 14, 15 forming the bearing post for the steering standard 16 of the front truck 16'. The upper end of the steering standard 16 extends above the member 14 and has fixed thereto, in any suitable manner, turning means comprising the horizontally extending arcuate rack 17 which cooperates with actuating mechanism in a manner to be described. The crank shaft of the engine projects forwardly in the usual manner, as at 18, and on the under side of the radiator 12 there is fastened a housing 19 having a horizontally extending bearing in which there is journaled a cranking shaft 20 in axial alinement with the engine shaft 18. The shaft 20 is provided with a cylindrical head 21 having coupling notches 22 adapted to cooperate with coupling lugs 23 on the engine shaft. The shaft 20 is threaded for a portion of its length as at 24 and a correspondingly threaded sprocket pinion 25 receives this portion of the shaft and is held against longitudinal movement thereon by being positioned between the rear face of the housing 19 and the bearing 26, which is preferably formed as an extension of housing 19. The forward end of cranking shaft 20 is formed with a longitudinally extending groove 27, and a spring pressed vertical pin 28 mounted in the bottom of the housing 19 has a rounded end normally seated in this groove to yieldingly hold shaft 20 against rotation. A sprocket chain 29 connects sprocket 25 with a sprocket 30 which is keyed to or otherwise fixed to a gear 31 journaled on a short counter-shaft 32 positioned directly above sprocket 25 and journaled in the upper section of the radiator, as clearly illustrated on the drawing.

As actuating means for both the steering means and the cranking means, there is provided the horizontally positioned rearwardly extending shaft 33 which in this instance extends above the radiator and engine and is journaled in front and rear bearings 34, 35 on the tractor frame. The forward end of the shaft 33 extends over the rack 17 and has secured to it spur gears 36 and 37 which may be fastened together as shown and which are respectively adapted to be brought into mesh with gear 31 and rack 17 by axial movement of shaft 33. Normally, shaft 33 is in use as the steering shaft with pinion 37 in mesh with the rack 17 and, to permit shifting of this shaft rearwardly in order to bring gear 36 into mesh with gear 31 for actuation of the cranking mechanism, the stop collar 38 engaging the bearing 34 is provided with a releasing means, such as a removable pin 39, passing through the collar and through an opening in shaft 33. The actuating shaft 33 is provided with the usual steering wheel 40 on its rear end and in this instance with an auxiliary handle 41 for use when turning the shaft to actuate the starting mechanism.

Except when it becomes necessary to start, or crank, the engine, the shaft 33 will be connected to rack 17 as shown in the drawing and used as a steering shaft in the usual way. When it is desired to connect it to the cranking mechanism and to actuate it for cranking the engine, the pin 39 is withdrawn and shaft 33 pulled rearwardly to bring gear 36 into mesh with gear 31. If handle 41 is then grasped and the shaft 33 given a few quick turns in a clockwise direction, the motion will be transmitted through the gearing described to the shaft 20 and, as pinion 25 is in screw threaded relation to the shaft 20 and this shaft is yieldably held against rotation by the pin 28 seated in groove 27, the shaft 20 will be moved rearwardly on its axis for a predetermined distance and until the engine shaft 18 and head 21 are interlocked. At this point, the pin 28 will have passed just beyond the end of shaft 20 and out of groove 27 and continued rotation of pinion 25 will transmit rotary movement to shaft 20 and, therefore, to the engine shaft also. Starting of the engine will cause accelerated rotation of shaft 20 and initiate its reverse axial movement, thereby freeing it from the engine shaft and, as the pin 28 again engages groove 27, the operator will reverse rotation of shaft 33 and thereby complete the retraction of shaft 20, the pin 28 yielding if rotation continues after shaft 20 is fully retracted.

It is evident from the foregoing description that a simple and efficient steering and cranking device for tractors has been devised and while the specific construction described presents the preferred form of the invention, it will be evident that certain modifications may be made within the scope of the following claims.

I claim as my invention:

1. Control mechanism for self-propelled vehicles comprising the combination of an upright steering standard having an arcuate rack fixed thereto, a cranking shaft having drive gearing connected thereto and located adjacent said arcuate rack, and an axially shiftable actuating shaft provided with spur gears positioned between said rack and drive gearing and adapted to be engaged with either, alternatively, by axial movement of said actuating shaft.

2. In control mechanism for tractors having a forward steering truck, the combination with the crank shaft of the engine and the upright swiveled standard of the truck, of a steering wheel and shaft, a cranking shaft journaled adjacent the end of the engine crank shaft, a counter-shaft journaled above the cranking shaft and geared thereto, and means for connecting the steering shaft to the standard or to the counter-shaft comprising cooperating gears on the standard, counter-shaft and steering shaft respectively, and means for selectively connecting the steering shaft to either the standard or the counter-shaft.

3. In control mechanism for tractors having a front dirigible support including an upright swiveled standard located ahead of the engine and a steering shaft normally geared to the standard and extending rearwardly above the engine and shiftable axially, the combination therewith of engine cranking mechanism located between the engine and standard including a cranking shaft in alinement with the engine shaft, a counter-shaft parallel to and adjacent the steering shaft, a driving connection between said cranking shaft and counter-shaft, and gears on the steering shaft and counter-shaft positioned to be brought into mesh by axial movement of the steering shaft.

In testimony whereof I affix my signature.

JOHN E. ANTHONY.